Oct. 27, 1959 J. R. BETTS 2,910,087
MILKING APPARATUS
Filed June 25, 1956 2 Sheets-Sheet 1

INVENTOR.
JOHN R. BETTS
BY Flournoy Corey
ATTORNEY.

Oct. 27, 1959  J. R. BETTS  2,910,087
MILKING APPARATUS

Filed June 25, 1956  2 Sheets-Sheet 2

INVENTOR.
JOHN R. BETTS
BY
Flournoy Corey.
ATTORNEY.

United States Patent Office 2,910,087
Patented Oct. 27, 1959

2,910,087

MILKING APPARATUS

John R. Betts, Hastings, Nebr.

Application June 25, 1956, Serial No. 593,748

4 Claims. (Cl. 137—559)

This invention is concerned with a sanitary milking apparatus, and particularly one in which the milk is collected in a chilled tank and subsequently transferred to a bulk storage receptacle.

The growing demands of the dairy industry and the high costs of handling have required the dairy farmer to turn with increasing need to bulk milking and milk handling methods. Various methods of collection are now employed to secure this volume efficiency, most of these methods involving the use of a central storage tank with a large amount of stainless steel pipe led through the stalls and utilized to convey the milk from the milking machine to the storage tank. While this method permits bulk handling, it involves severe problems of sanitation to such a great extent that some market areas refuse to accept milk which has been handled with this manner.

It is therefore a primary object of my invention to provide a system which permits bulk handling and yet does not prevent the thorough cleaning of all utensils used in the collecting operation.

It is a still further object of my invention to provide a collecting tank which is so constructed as to be free of any crevices or ledges which would permit the collecting of undesirable bacteria.

It is still a further object of my invention to provide a collecting tank which may be subjected to vacuum without the possibility of the contents of the tank entering the vacuum lines.

It is a still further object of my invention to provide a collecting tank which can be disconnected from all vacuum lines and yet retain its vacuumized condition.

It is yet another object of my invention to provide a device in which the collecting tank is easily portable from one position of the barn to another in order to be positioned adjacent any number of cows successively.

It is a still further object of my invention to provide a collection tank which may be chilled to prevent milk spoilage.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims without departing from the spirit of the invention.

Figure 1:
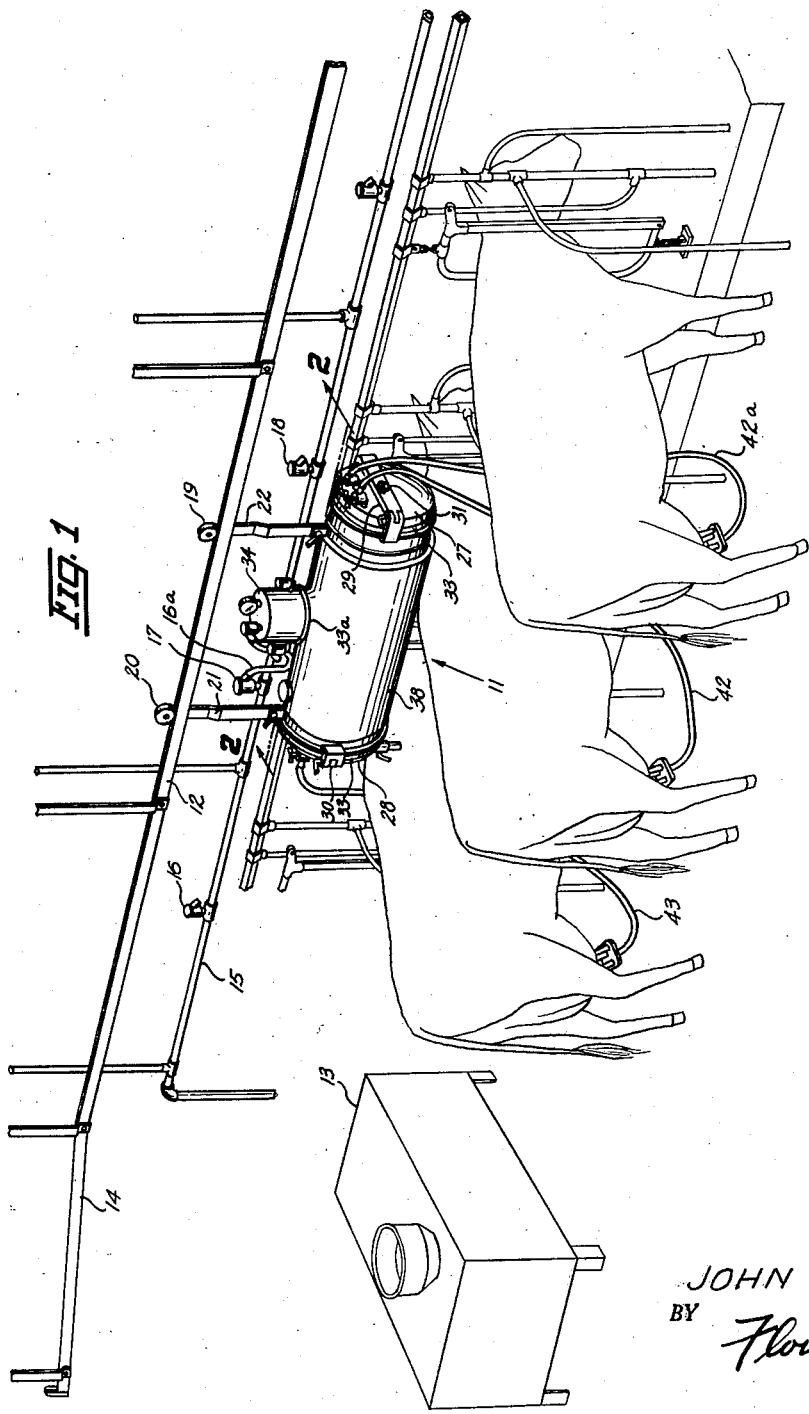
Figure 1 is a view of a portion of a cow barn containing a milking apparatus constructed according to my invention.

Referring now to the drawings, and more particularly to Figure 1; generally a milking apparatus constructed according to my invention includes four essential portions. Number 11 is the primary collecting tank which is suspended on an overhead track 12 at a convenient elevation in relation to the cows to be milked. The track extends over a central bulk tank 13, the track being slanted, as at 14, to permit thorough drainage of the primary tank 11. Below the track element is a vacuum line 15 with a plurality of vacuum valves 16, 17 and 18. This vacuum line is attached to a conventional vacuum pump, which is not shown in this figure but could be of any standard manufacture.

Figure 2:
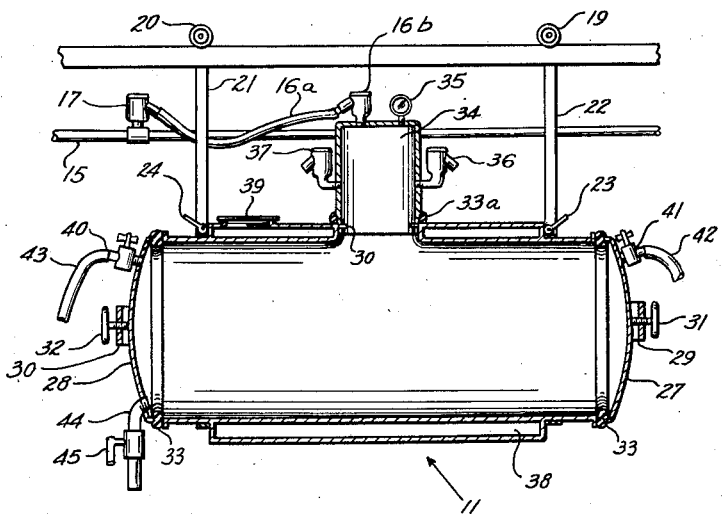
Figure 2 is a view in cross section of the primary collecting tank, such as is shown in Figure 1.
Figure 3:
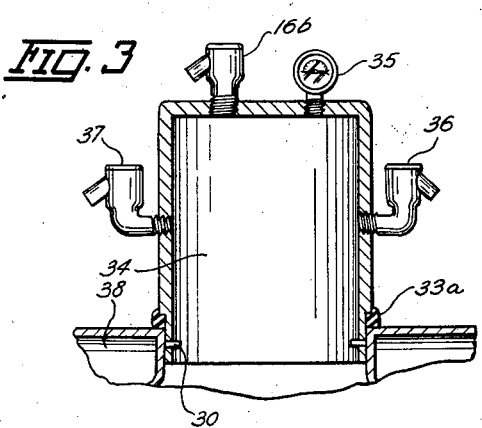
Figure 3 is an enlarged, cross-section view of the domed portion of the collecting tank shown in Figure 2.

Referring now to Figure 2, I will describe the primary collecting tank in detail. This tank, generally at 11, as has been heretofore stated, is suspended on a track 12 by means of rollers 19 and 20. Dropping downwardly from these rollers are supporting members 21 and 22 which are removably connected by means of a wing nut 23 and 24 to circular bands 25 and 26. These supports and bands are removably secured to the tank in order that the tank may be taken down from the track for cleaning purposes.

The tank itself is of heavy gauge material, preferably stainless steel or some other non-corrosive material, and generally has a diameter of approximately one-fourth its length, with a total capacity of 50 gallons. The ends of the tank are covered with removable dish-shaped covers 27 and 28. These are held in position by cross bars 29 and 30, which can be forced into tight engagement with the tank ends by screws 32 and 31. It is desirable to position a removable gasket 33 between these end covers and the tank itself. Preferably this gasket material should be of transparent plastic material so that the contents in the tank can be seen in order to determine the milk level at any given time.

On the top of the tank is positioned a small dome portion 34. It is this dome to which the vacuum line 16a is connected, a connection being made through a valve 16b. The dome also contains a vacuum gauge 35, and two additional side valves 36 and 37. These side valves are provided to supply additional vacuum power for conventional milkers which utilize secondary vacuums for pulsation purposes. This dome is attached to the primary tank using a pin 30 and slot connection, with a plastic gasket member 33a between the dome and the tank itself. It will be apparent that the vacuum pressure will enter the main tank of this dome, and that by reason of the elevation of the valve above the primary tank, a safe area is maintained to prevent milk from entering the vacuum lines.

It is desirable that milk be kept at a low temperature during the period of collection, and for that purpose I have provided a secondary stainless steel housing 38 around the tank which is adapted to hold chilled water or crushed ice, the ice or water being introduced into this secondary tank through the capped opening 39. It should be noted that this secondary tank is not in communication with the primary tank in any manner, and that milk cannot gain entrance into the secondary tank.

A plurality of vacuum lines extend from the primary tank to individual milking assemblies, which milking assemblies may be of standard manufacture, and are attached to the dished cover portions at 40 and 41, these numerals representing two of several shut-off cocks which may be closed whenever desired. The lines themselves are referred to by numerals 42, 42a and 43. One dished portion has a discharge spout 44 which carries the shut-off cock 45.

Figure 4:
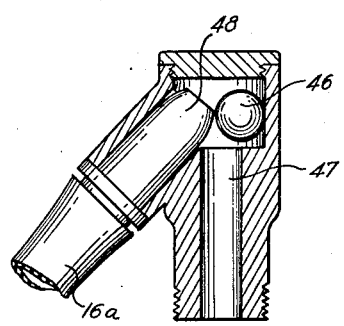
Figure 4 is an enlarged view of a type of valve used at various stations in the milking apparatus.
Figure 5:
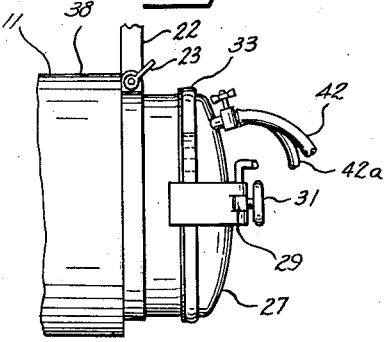
Figure 5 is an end view of the device to show the transparent gasket.

The valves used in the dome portion and in the vacuum lines are of a standard design in common use in the dairy farming field. They are shown in some detail in Figure 4 in order that it may be understood that the line, such as 16a, may be readily connected and disconnected from the tank. The valves contain a ball 46 which normally rests on a seat portion 47 to secure a closure of the valve. When the nozzle of the line 16a is inserted upwardly into the body of the valve member, the nozzle 48 pushes the ball 46 to one side, thus permitting suction to be applied to the tank proper.

In operation, the primary collecting tank is rolled to a position to the rear of a pair of cows intermediate of the two, and one line connected to each milking apparatus. The milk is withdrawn, collected into the tank, and when the milking operation is finished, the primary collecting tank is then rolled to another set of stanchions. When the tank is filled, it may then be rolled along the track to the central storage tank 13, the outlet valve 44 being positioned above the tank and the milk drained into the storage tank. It will be apparent that the opening of any of the valves, such as 40 or 41, will break the vacuum seal.

When the milking operation is completed, the tank may be taken down, the two dome-like ends removed and cleaned. The same procedure is followed with the dome portion 34. It is in this manner that this device would meet all sanitary requirements and yet permit efficient low cost bulk milk handling.

Although I have described a specific embodiment of my invention, it is apparent that modifications may be made by those skilled in the art. Such modifications may be made without departing from the spirit and scope of my invention as set forth in the appended claims.

I claim as my invention:

1. In a milk collecting apparatus, in combination, a primary collecting tank, said tank being cylindrical and open at both ends, dished cover portions adapted to be removably secured to said open ends, said dished cover portions having secondary vacuum lines therein, a removable dome portion centrally of and above said tank and having a primary vacuum line operatively attached thereto, said primary line being in communication with said dome at the uppermost point thereof, said dome being in communication with said primary collecting tank, the positioning of said primary line, dome and tank being such as to provide substantial spacing to prevent the movement of milk therebetween, said collecting tank being mounted for lateral movement.

2. In a milk collecting apparatus, in combination, a primary collecting tank, said tank being cylindrical and open at both ends, dished cover portions adapted to be removably secured to said open ends, said dished cover portions having secondary vacuum lines therein, a removable dome portion centrally of and above said tank and having a primary vacuum line operatively attached thereto at its uppermost point and in communication with the said dome, said dome being in communication with said primary collecting tank, the vertical position of said primary line, dome and tank being such as to prevent the movement of milk therebetween, said collecting tank being mounted for lateral movement, and a secondary container about the primary collecting tank adapted to hold coolant.

3. In a milk collecting apparatus, in combination, a primary collecting tank, said tank being cylindrical and open at both ends, dished cover portions adapted to be removably secured to said open ends, said dished cover portions having secondary vacuum lines therein, a removable dome portion centrally of and above said tank and having a primary vacuum line operatively attached thereto and in communication with the interior of said dome, said dome being in communication with said primary collecting tank, the relative vertical spacing relation of said primary line, dome and tank being such as to prevent the movement of milk therebetween, said collecting tank being mounted for lateral movement, and transparent seal members positioned between said dished members and said primary collection tank to permit visual inspection of the contents.

4. In a milk collecting apparatus, in combination, a primary collecting tank, said tank being cylindrical and open at both ends, dished cover portions adapted to be removably secured to said open ends, said dished cover portions having secondary vacuum lines therein, a removable dome portion centrally of and above said tank and having a primary vacuum line operatively attached thereto and in communication with the interior of said dome, said dome being in communication with said primary collecting tank, the positioning of said primary line, dome and tank being such as to prevent the movement of milk therebetween, said collecting tank being mounted for lateral movement, and means for suspending said collecting tank from said track, said means being adapted to permit the removal of said tank therefrom for cleaning and the like.

References Cited in the file of this patent

UNITED STATES PATENTS

| | | |
|---|---|---|
| 1,210,818 | Lindstrom | Jan. 2, 1917 |
| 1,603,429 | Uphaus | Oct. 19, 1926 |
| 2,001,040 | Sweeney | May 14, 1935 |
| 2,152,956 | Etzkorn | Apr. 4, 1939 |
| 2,366,273 | Lowry | Jan. 2, 1945 |
| 2,693,703 | Rawson | Nov. 9, 1954 |
| 2,697,483 | Stanley | Dec. 21, 1954 |
| 2,735,399 | Henrard | Feb. 21, 1956 |
| 2,755,769 | Larsen | July 24, 1956 |